(12) United States Patent
McIntire

(10) Patent No.: US 8,622,457 B1
(45) Date of Patent: Jan. 7, 2014

(54) VEHICLE TOP

(76) Inventor: David Blair McIntire, Grants Pass, OR (US)

( * ) Notice: Subject to any disclaimer, the term of this patent is extended or adjusted under 35 U.S.C. 154(b) by 0 days.

(21) Appl. No.: 13/451,519

(22) Filed: Apr. 19, 2012

(51) Int. Cl.
*B60J 7/11* (2006.01)

(52) U.S. Cl.
USPC .......................... 296/102; 296/213; 280/756

(58) Field of Classification Search
USPC ........... 296/219, 213, 215, 218, 102; 280/756
See application file for complete search history.

(56) References Cited

U.S. PATENT DOCUMENTS

| | | | |
|---|---|---|---|
| 2,946,624 A | 7/1960 | Barenyl | |
| 4,095,841 A | 6/1978 | Thompson et al. | |
| 4,149,750 A | 4/1979 | Thompson et al. | |
| 4,626,026 A * | 12/1986 | Hasegawa | 296/218 |
| 4,679,847 A | 7/1987 | Dirck | |
| 5,205,607 A | 4/1993 | Takeuchi | |
| 5,738,405 A | 4/1998 | Richters et al. | |
| 5,931,114 A * | 8/1999 | Bartholomew | 114/361 |
| 6,186,584 B1 * | 2/2001 | Samuelson et al. | 296/213 |
| 6,189,962 B1 | 2/2001 | Henderson | |
| 6,513,864 B2 * | 2/2003 | Bohm et al. | 296/214 |
| 6,793,277 B2 | 9/2004 | Chon et al. | |
| 6,851,739 B2 | 2/2005 | Morley | |
| 7,086,693 B1 | 8/2006 | Huisman | |
| 2006/0220419 A1 * | 10/2006 | Miura | 296/190.03 |
| 2007/0018485 A1 * | 1/2007 | Jacobson | 296/210 |
| 2007/0182217 A1 | 8/2007 | Saleen et al. | |
| 2010/0045075 A1 | 2/2010 | Mack et al. | |

* cited by examiner

*Primary Examiner* — Joseph Pape
*Assistant Examiner* — Dana Ivey
(74) *Attorney, Agent, or Firm* — Jerry Haynes Law

(57) ABSTRACT

A vehicle top includes a transparent or semi-transparent vehicle top panel adapted to attach to the vehicle and cover the passenger compartment, at least one pair of drip rails carried by the vehicle top panel on opposite sides of the vehicle top panel and at least one attachment mechanism carried by the vehicle top panel and adapted to attach the vehicle top panel to the vehicle.

4 Claims, 5 Drawing Sheets

VEHICLE TOP

FIELD OF THE INVENTION

Embodiments of the disclosure relate to tops for vehicles. More particularly, embodiments of the disclosure relate to a vehicle top which is suitable for convertible off-road sports vehicles and facilitates entry of sunlight and air into the passenger compartment of the vehicle.

BACKGROUND OF THE INVENTION

Convertible off-road sports vehicles such as those of the JEEP® brand have increased in popularity in recent years due in large part to their off-road capabilities. Convertible off-road sports vehicles have an open passenger compartment. A frame which is fitted with a roll bar surrounds the passenger compartment to protect occupants in the event of an accident. A cover which is made of a soft canvas or canvas-like material can be detachably fitted on the frame. The cover typically has a non-transparent top with transparent or semi-transparent side and rear windows.

The conventional cover for convertible off-road sports vehicles forms an enclosure around and transmits little sunlight or air into the passenger compartment of the vehicle. Additionally, many of the conventional covers are not waterproof and fail to prevent entry of precipitation into the passenger compartment. Therefore, a vehicle top which is suitable for convertible off-road sports vehicles and facilitates entry of sunlight and air and prevents entry of precipitation into the passenger compartment of the vehicle is desirable.

SUMMARY OF THE INVENTION

Embodiments of the disclosure are generally directed to a vehicle top for a convertible vehicle having a passenger compartment. An illustrative embodiment of the vehicle top includes a transparent or semi-transparent vehicle top panel adapted to attach to the vehicle and cover the passenger compartment, at least one pair of drip rails carried by the vehicle top panel on opposite sides of the vehicle top panel and at least one attachment mechanism carried by the vehicle top panel and adapted to attach the vehicle top panel to the vehicle.

BRIEF DESCRIPTION OF THE DRAWINGS

Embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is non-limiting and is not necessarily to be construed as preferred or advantageous over other implementations. All of the implementations described below are exemplary implementations provided to enable persons skilled in the art to practice the disclosure and are not intended to limit the scope of the appended claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "upper", "lower", "front", 'rear", "side", "interior" and "exterior" as used herein are intended for descriptive purposes only and are not necessarily intended to be construed in a limiting sense.

Figure 1:
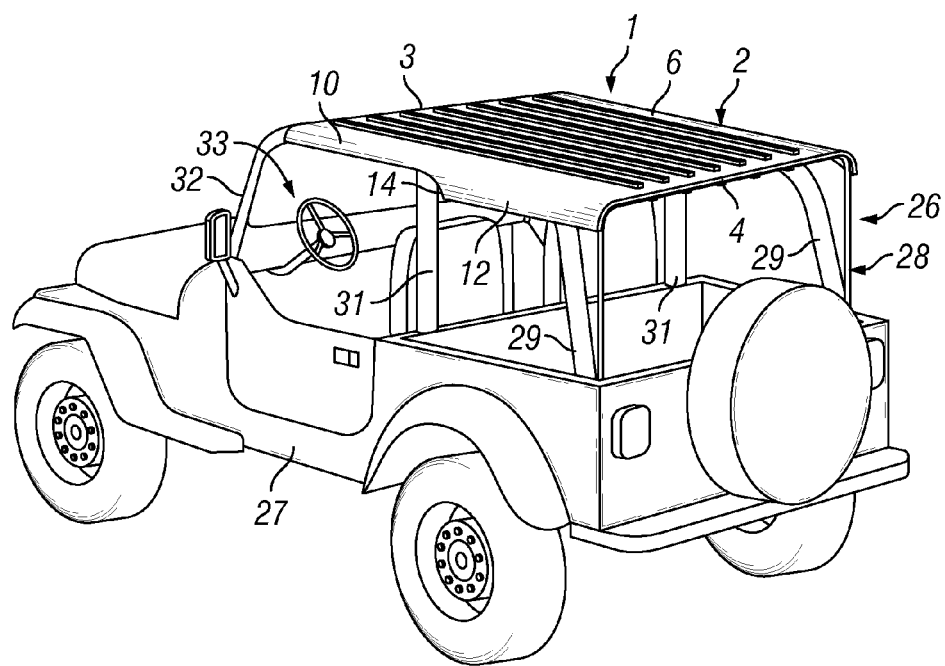
FIG. 1 is a rear perspective view of a convertible off-road sports vehicle, with an illustrative embodiment of the vehicle top deployed on the vehicle.

Referring initially to FIGS. 1-5 of the drawings, an illustrative embodiment of the vehicle top is generally indicated by reference numeral 1. As illustrated in FIG. 1 and will be hereinafter described, the vehicle top 1 is adapted for attachment to a convertible vehicle 26 which in some applications may be a convertible off-road sports vehicle. The vehicle top 1 facilitates transmission of sunlight into a passenger compartment 33 of the vehicle 26 while preventing precipitation from entering the passenger compartment 33 during operation of the vehicle 26. The vehicle top 1 may additionally shield occupants of the passenger compartment 33 from potentially harmful UV radiation.

The vehicle top 1 includes a vehicle top panel 2 which may have a generally elongated, rectangular shape. The vehicle top panel 2 is a transparent or semi-transparent plastic material. In some embodiments, the vehicle top panel 2 may be a transparent or semi-transparent thermoplastic such as poly (methyl methacrylate) (PMMA), for example and without limitation. The material of construction of the vehicle top panel 2 may be selected to maximize transmission of visible light through the vehicle top panel 2 and filtering of UV radiation. The vehicle top panel 2 and other components of the vehicle top 1 can be molded using conventional vacuum-molding and/or other fabrication techniques which are known by those skilled in the art. The vehicle top panel 2 has a front panel edge 3 and a rear panel edge 4 which may be generally parallel to each other. The vehicle top panel 2 further includes an interior panel surface 5 and an exterior panel surface 6.

Figure 4:
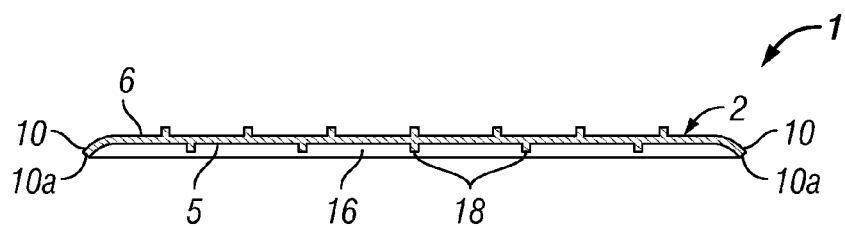
FIG. 4 is a cross-sectional view taken along section lines 4-4 in FIG. 3.

At least one pair of drip rails 10, 12 extends from opposite sides of the vehicle top panel 2. In some embodiments, the drip rails 10, 12 may include a pair of elongated front drip rails 10 which extend outwardly from respective sides of the vehicle top panel 2. Each front drip rail 10 may extend rearwardly from the front panel edge 3 and terminate between the front panel edge 3 and the rear panel edge 4. As illustrated in FIG. 4, each front drip rail 10 may be generally curved in cross-section and is concave with respect to the interior panel surface 5 and convex with respect to the exterior panel surface 6. Each front drip rail 10 may have an elongated front drip rail edge 10a.

Figure 5:
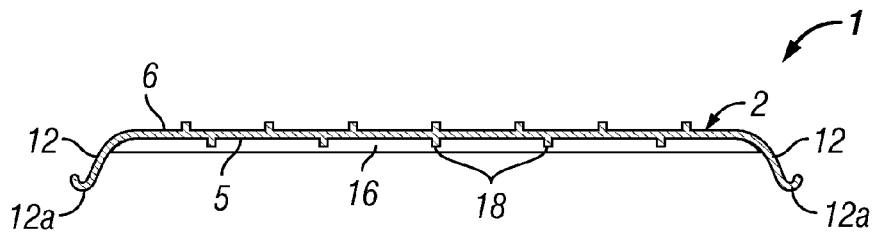
FIG. 5 is a cross-sectional view taken along section lines 5-5 in FIG. 3.

The drip rails 10, 12 may further include a pair of elongated rear drip rails 12 which extend outwardly from respective sides of the vehicle top panel 2. Each rear drip rail 12 may extend rearwardly from the corresponding front drip rail 10 and terminate at the rear panel edge 4. As illustrated in FIG. 5, each rear drip rail 12 may be generally curved in cross-section and is concave with respect to the interior panel surface 5 and convex with respect to the exterior panel surface 6. Each rear drip rail 12 may have an outwardly-curved rear drip rail edge 12a. When the vehicle top 1 is deployed on the convertible off-road sports vehicle 26 (FIG. 1), as will be hereinafter described, the front drip rails 10 and the rear drip rails 12 curve downwardly from the plane of the vehicle top panel 2.

The front drip rails 10 may conform in shape to the respective front doors (not illustrated) of the convertible off-road sports vehicle 26 (FIG. 1) to which the vehicle top 1 is attached and maintain sufficient clearance to accommodate opening and closing of the doors. Therefore, in some embodiments, each rear drip rail 12 may extend further (have a greater extent of curvature) outwardly and downwardly from the vehicle top panel 2 than each front drip rail 10, as illustrated. Accordingly, a drip rail notch 14 may transition between the front drip rail 10 and the rear drip rail 12 each side of the vehicle top panel 2.

Figure 3:
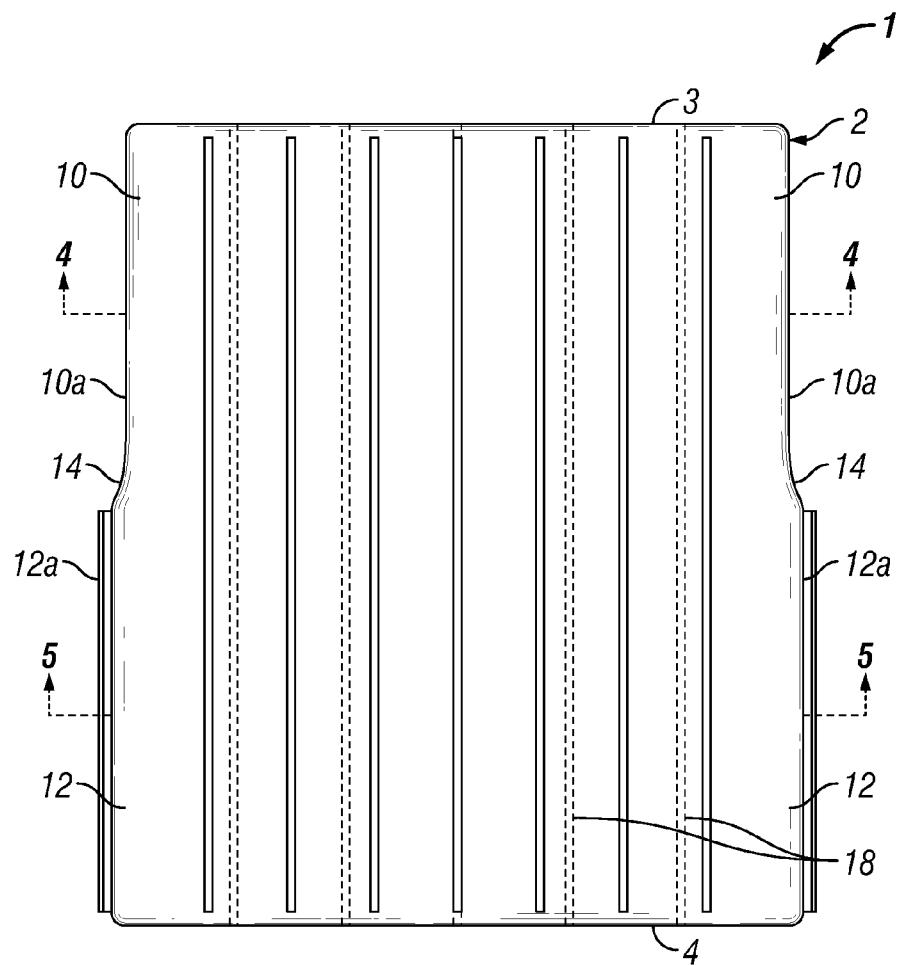
FIG. 3 is a top view of an illustrative embodiment of the vehicle top.

As illustrated in FIGS. 3-5, in some embodiments, multiple panel stiffeners 16 may extend transversely across the vehicle top panel 2 for stiffening or reinforcing purposes. In the illustrative embodiment illustrated in FIG. 3, three panel stiffeners 16 extend across the vehicle top panel 2 in substantially parallel, spaced-apart relationship to each other. In other embodiments, a greater or lesser number of the panel stiffeners 16 may extend across the vehicle top panel 2. As illustrated in FIGS. 4 and 5, in some embodiments, the panel stiffeners 16 may extend between the front drip rails 10 and between the rear drip rails 12 and may protrude from the interior panel surface 5 of the vehicle top panel 2. The panel stiffeners 16 may be molded or otherwise fabricated into the vehicle top panel 2 according to the knowledge of those skilled in the art.

As further illustrated in FIGS. 3-5, in some embodiments, multiple strakes 18 may extend longitudinally along the vehicle top panel 2 for stiffening or reinforcing purposes. As illustrated in FIG. 3, the strakes 18 may intersect the panel stiffeners 16. In the illustrative embodiment illustrated in FIG. 3, seven strakes 18 extend across the vehicle top panel 2 in substantially parallel, spaced-apart relationship to each other. In other embodiments, a greater or lesser number of the strakes 18 may extend across the vehicle top panel 2. As illustrated in FIG. 3, in some embodiments, the strakes 18 may extend between the front panel edge 3 and the rear panel edge 4. As illustrated in FIGS. 4 and 5, the strakes 18 may protrude from the interior panel surface 5 of the vehicle top panel 2. The strakes 18 may be molded or otherwise fabricated into the vehicle top panel 2 according to the knowledge of those skilled in the art.

Figure 8:
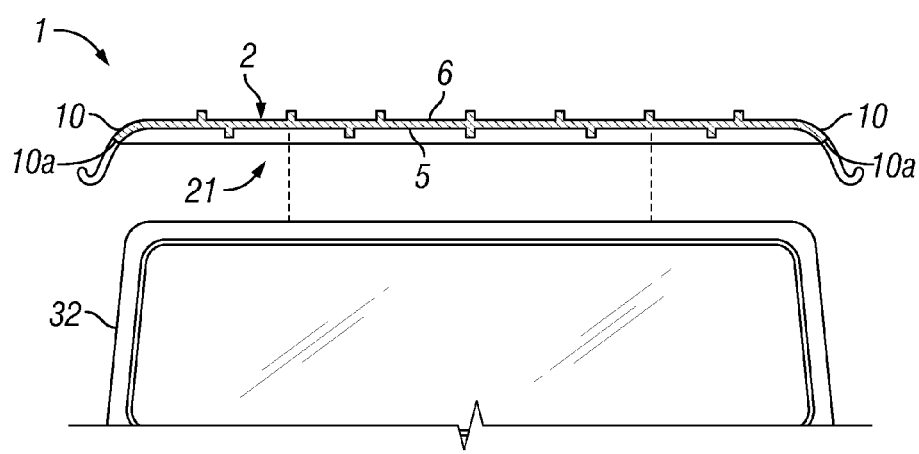
FIG. 8 is a front sectional view of a windshield frame of a convertible off-road sports vehicle, more particularly illustrating exemplary attachment of the vehicle top to the windshield frame using a pair of panel clamps.

As illustrated in FIG. 8, the vehicle top panel 2 may be fitted with at least one attachment mechanism 21 which facilitates attachment of the vehicle top panel 2 to the vehicle 26. The attachment mechanism 21 may include but is not limited to standard methods or techniques used to attach vehicle covers to the passenger compartment frame 28 at the conventional factory attachment points. In some embodiments, the attachment mechanism 21 may include at least one panel clamp 22 which may be attached to the vehicle top panel 2 according to the knowledge of those skilled in the art and facilitates attachment of the vehicle top panel 2 to the vehicle 26 typically as will be hereinafter described.

Referring next to FIGS. 1, 2 and 6-8 of the drawings, exemplary implementation of an illustrative embodiment of the vehicle top 1 is illustrated. When deployed on a convertible off-road sports vehicle 26, the vehicle top 1 facilitates entry of sunlight into the passenger compartment 33 of the vehicle 26 while preventing rainwater from dripping from the vehicle top 1 into the passenger compartment 33. In some applications, the convertible off-road sports vehicle 26 may be a JEEP™ vehicle. Accordingly, the vehicle 26 generally may include a vehicle chassis 27 from which extends a passenger compartment frame 28. The passenger compartment frame 28 encloses a passenger compartment 33. The passenger compartment frame 28 may include a pair of rear frame members 29, a pair of top frame members 30 which extend forwardly from the respective rear frame members 29 and roll bars 31 which extend upwardly from the vehicle chassis 27 to the top frame members 30. A windshield frame 32 extends from the vehicle chassis 27 at the front of the passenger compartment 33 and may be reinforced by the top frame members 30.

Figure 2:
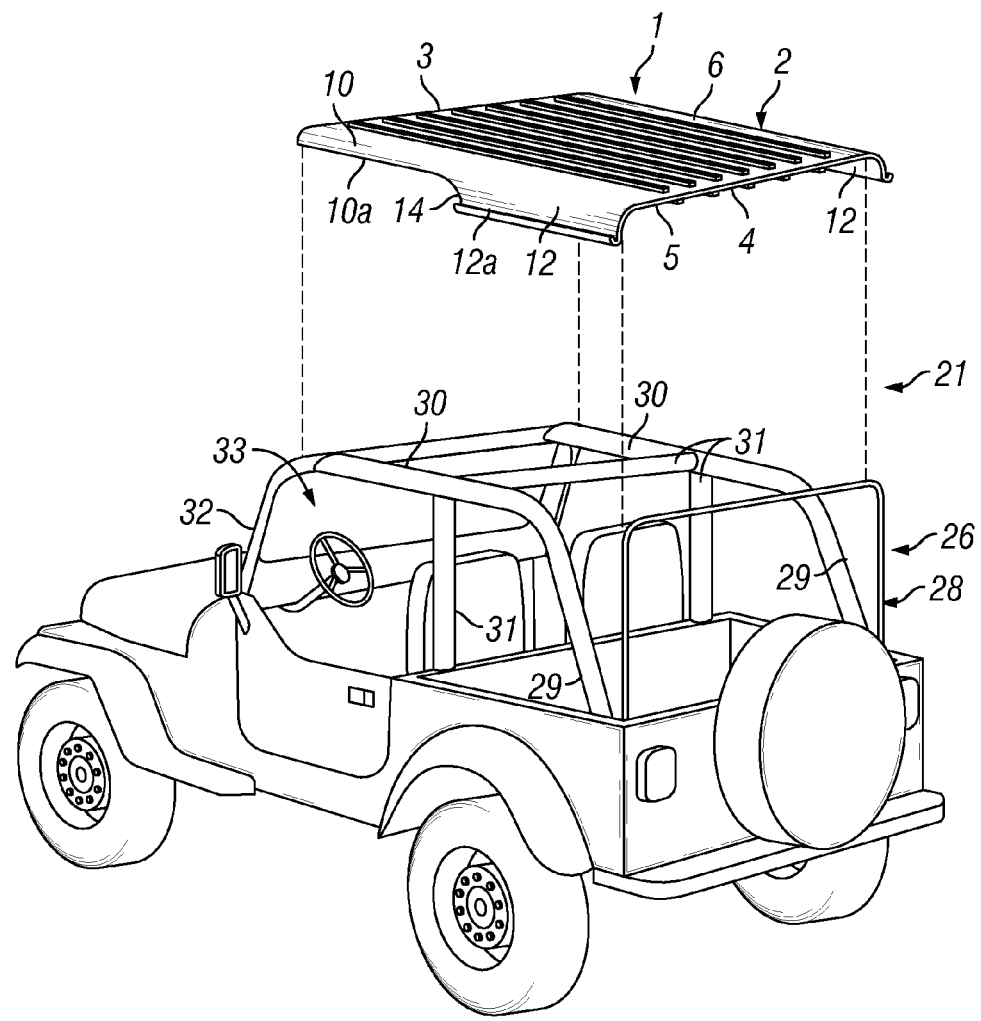
FIG. 2 is an exploded perspective view illustrating exemplary attachment of the vehicle top to the vehicle.
Figure 6:
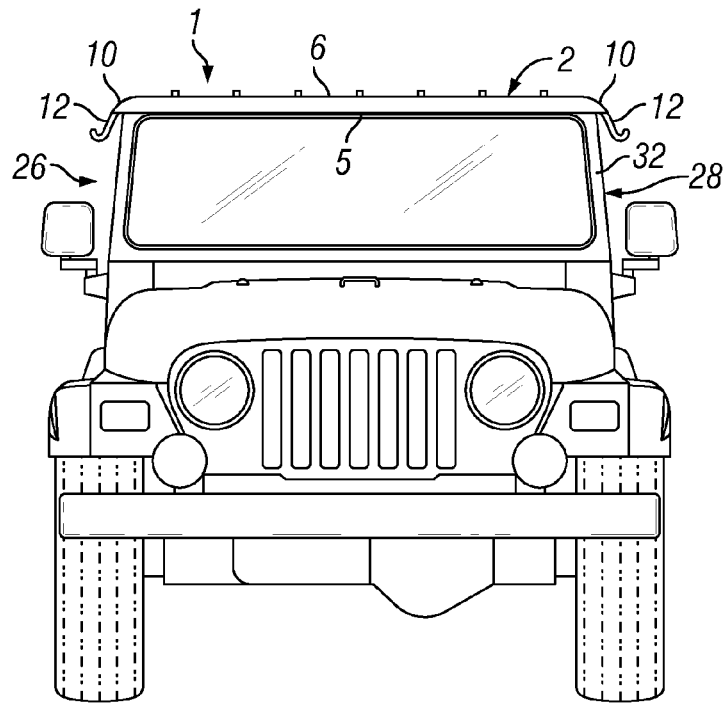
FIG. 6 is a front view of a convertible off-road sports vehicle, with an illustrative embodiment of the vehicle top deployed on the vehicle.
Figure 7:
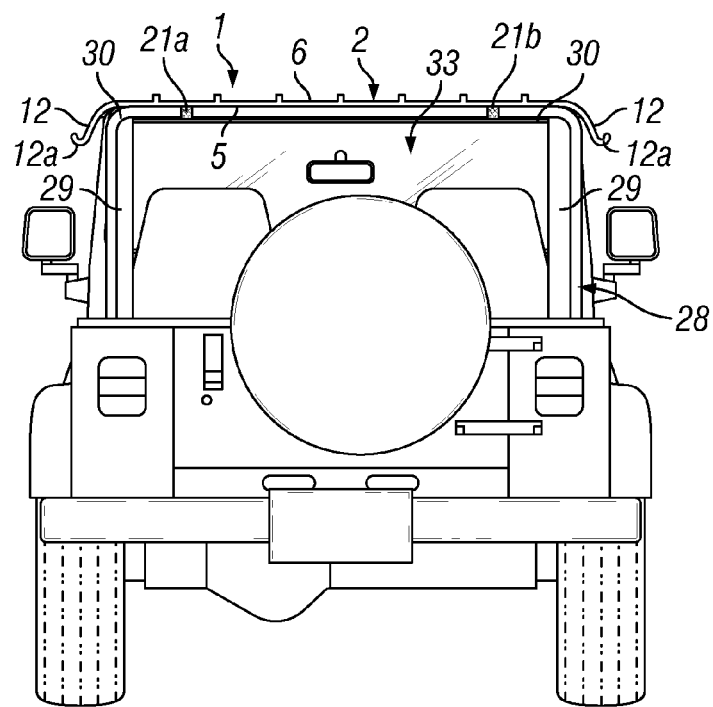
FIG. 7 is a rear view of a convertible off-road sports vehicle, with an illustrative embodiment of the vehicle top deployed on the vehicle.

As illustrated in FIGS. 2, 6 and 7, the vehicle top 1 may be attached to the passenger compartment frame 28 by first orienting the front panel edge 3 with the windshield frame 32 and then extending the front drip rails 10 and the rear drip rails 12 over the top and side surfaces of the respective top frame members 30. As illustrated in FIG. 8, the vehicle top panel 2 may be secured to the windshield frame 32 by attaching the panel clamp or clamps 22 of the attachment mechanism 21 to the windshield frame 32. In some embodiments, the attachment mechanism 21 may include a pair of panel attachment straps 21a and 21b (FIG. 7) which secures the rear portion of the vehicle top panel 2 to the rear frame members 29 and/or the top frame members 30 of the passenger compartment frame 28. Additional or alternative attachment mechanisms known by those skilled in the art may be used to attach the vehicle top 1 to the passenger compartment frame 28. As illustrated in FIG. 1, the vehicle top panel 2 may be configured to cover the entire portion of the passenger compartment 33.

During operation of the vehicle 26, the vehicle top 1 offers the impression that the vehicle 26 is topless to occupants in the passenger compartment 33 while facilitating transmission of sunlight directly from above the vehicle 26 into the passenger compartment 33 and preventing entry of precipitation into the passenger compartment 33. The vehicle top 1 may additionally prevent or minimize entry of potentially harmful UV radiation into the passenger compartment 33. The front drip rails 10 and the rear drip rails 12 extend outwardly and downwardly from the respective top frame members 30 of the passenger compartment frame 28 and facilitate runoff of precipitation (not illustrated) from the respective sides of the vehicle top panel 2. Therefore, the front drip rails 10 and the rear drip rails 12 prevent the precipitation from dripping off the sides of the vehicle top panel 2 into the passenger compartment 33. When use is not desired, the vehicle top 1 can be selectively removed from the vehicle 26 by detaching the panel clamps 22 (FIG. 8) from the windshield frame 32 and detaching the rear portion of the vehicle top panel 2 from the rear frame members 29 and/or the top frame members 30 of the passenger compartment frame 28.

It will be appreciated by those skilled in the art that the vehicle top 1 gives occupants of the vehicle 26 the impression that the vehicle 26 is being operated without a cover while protecting the occupants from potentially harmful UV radiation and precipitation. The vehicle top 1 can be fabricated in one piece with a lightweight construction to enable as few as one person to selectively deploy the vehicle top 1 on or remove the vehicle top 1 from the vehicle 26. The attachment mechanism 21 may include but is not limited to provisions for attachment of the vehicle top 1 to the passenger compartment frame 28 at the conventional factory attachment points for vehicle covers.

While various illustrative embodiments of the disclosure have been described above, it will be recognized and understood that various modifications can be made in the disclosure and the appended claims are intended to cover all such modifications which may fall within the spirit and scope of the embodiments of the disclosure.

What is claimed is:

1. A vehicle top for a convertible vehicle having a passenger compartment, comprising:
    a generally elongated, rectangular, transparent or semi-transparent vehicle top panel adapted to attach to the convertible vehicle and cover the passenger compartment and having a first panel edge, a second panel edge opposite the first panel edge, a first panel surface and a second panel surface opposite the first panel surface;
    a first pair of elongated drip rails carried by the transparent or semi-transparent vehicle top panel on opposite sides of the transparent or semi-transparent vehicle top panel and extending from the first panel edge;
    a second pair of elongated drip rails carried by the transparent or semi-transparent vehicle top panel on opposite sides of the transparent or semi-transparent vehicle top panel and generally extending from the first pair of drip panels, respectively, to the second panel edge;
    each of the first pair of drip rails and the second pair of drip rails curved in cross-section;
    each of the second pair of drip rails having a greater extent of curvature than each of the first pair of drip rails;
    a pair of drip rail notches transitioning between the first pair of drip rails and the second pair of drip rails, respectively; and
    at least one attachment mechanism carried by the transparent or semi-transparent vehicle top panel and adapted to attach the transparent or semi-transparent vehicle top panel to the convertible vehicle.

2. The vehicle top of claim 1 wherein the at least one attachment mechanism comprises at least one panel clamp carried by the transparent or semi-transparent vehicle top panel.

3. The vehicle top of claim 1 wherein the at least one attachment mechanism comprises at least one panel attachment strap carried by the transparent or semi-transparent vehicle top panel and adapted for attachment to the convertible vehicle.

4. The vehicle top of claim 1 further comprising a plurality of transverse panel stiffeners and a plurality of longitudinal strakes intersecting the transverse panel stiffeners on the transparent or semi-transparent vehicle top panel.

* * * * *